(12) United States Patent
Kobayashi

(10) Patent No.: US 11,656,029 B2
(45) Date of Patent: May 23, 2023

(54) REGENERATORS WITH PRESSURIZED CAVITY IN PARTITION WALLS

(71) Applicant: Hisashi Kobayashi, Bedford, NY (US)

(72) Inventor: Hisashi Kobayashi, Bedford, NY (US)

(73) Assignee: Praxair Technology, Inc., Danbury, CT (US)

( * ) Notice: Subject to any disclaimer, the term of this patent is extended or adjusted under 35 U.S.C. 154(b) by 375 days.

(21) Appl. No.: 16/898,970

(22) Filed: Jun. 11, 2020

(65) Prior Publication Data

US 2020/0300547 A1 Sep. 24, 2020

Related U.S. Application Data

(62) Division of application No. 15/859,819, filed on Jan. 2, 2018, now Pat. No. 10,746,469.

(60) Provisional application No. 62/445,024, filed on Jan. 11, 2017.

(51) Int. Cl.
| | |
|---|---|
| *F27D 17/00* | (2006.01) |
| *F28D 17/02* | (2006.01) |
| *F27D 99/00* | (2010.01) |
| *C03B 5/237* | (2006.01) |
| *F23D 99/00* | (2010.01) |
| *F23L 15/02* | (2006.01) |
| *F23C 7/06* | (2006.01) |
| *F23D 14/66* | (2006.01) |
| *F28D 21/00* | (2006.01) |

(52) U.S. Cl.
CPC ............ *F27D 17/004* (2013.01); *C03B 5/237* (2013.01); *F23C 7/06* (2013.01); *F23D 14/66* (2013.01); *F23D 91/02* (2015.07); *F23L 15/02* (2013.01); *F27D 17/002* (2013.01); *F27D 99/0033* (2013.01); *F28D 17/02* (2013.01); *F23L 2900/15021* (2013.01); *F27D 2017/007* (2013.01); *F28D 2021/0057* (2013.01); *Y02E 20/34* (2013.01)

(58) Field of Classification Search
CPC ...................................................... F27D 17/004
See application file for complete search history.

(56) References Cited

U.S. PATENT DOCUMENTS

| | | | | |
|---|---|---|---|---|
| 1,342,074 A | * | 6/1920 | Trinks ....................... | C21D 9/00 432/178 |
| 1,941,411 A | * | 12/1933 | Mulholland ............. | C03B 5/235 65/342 |
| 2,175,922 A | * | 10/1939 | Scott ........................ | C21D 1/74 373/128 |
| 2,224,404 A | * | 12/1940 | Machlet ................... | C21D 9/00 432/57 |
| 2,795,409 A | * | 6/1957 | Hall ......................... | F28D 17/04 432/92 |
| 3,311,362 A | * | 3/1967 | Rapson ............... | C22B 21/0084 75/677 |

(Continued)

FOREIGN PATENT DOCUMENTS

| | | |
|---|---|---|
| GB | 159559 | 2/1921 |
| JP | 2012086242 A | 5/2012 |

*Primary Examiner* — Nathaniel Herzfeld
(74) *Attorney, Agent, or Firm* — Donald T. Black

(57) ABSTRACT

A pressurized cavity is provided around at least a portion or all of a regenerator, within which gas such as flue gas is maintained at a pressure in excess of the pressure within the regenerator, to protect against leakage of gas through the walls of the regenerator.

6 Claims, 7 Drawing Sheets

(56) References Cited

U.S. PATENT DOCUMENTS

| | | | |
|---|---|---|---|
| 4,487,621 A * | 12/1984 | Richards | F27D 99/0073 |
| | | | 65/374.13 |
| 5,759,022 A | 6/1998 | Koppang et al. | |
| 5,921,771 A * | 7/1999 | Kobayashi | F23L 15/02 |
| | | | 432/179 |
| 6,113,874 A * | 9/2000 | Kobayashi | C01B 3/34 |
| | | | 585/653 |
| 2010/0212362 A1 | 8/2010 | Kobayashi et al. | |
| 2012/0021367 A1 * | 1/2012 | Zucchelli | C03B 5/237 |
| | | | 432/25 |
| 2016/0305656 A1 | 10/2016 | Wu et al. | |

* cited by examiner

REGENERATORS WITH PRESSURIZED CAVITY IN PARTITION WALLS

RELATED APPLICATIONS

This application claims the benefit of U.S. Non-Provisional application Ser. No. 15/859,819 filed on Jan. 2, 2018, which claims the benefit of U.S. Provisional Application Ser. No. 62/445,024, filed on Jan. 11, 2017, which is incorporated herein by reference.

FIELD OF THE INVENTION

The present invention relates to combustion in furnaces such as glassmelting furnaces, furnaces for heating and/or melting metals and ores; incinerators; cement kilns; and the like, wherein material is fed into the furnace and is heated and/or melted by the heat of combustion that occurs within the furnace.

BACKGROUND OF THE INVENTION

Furnace operation with regenerators, or with thermochemical regenerators (TCR), is an efficient heat recovery system for high temperature industrial furnaces such as glass melting, steel heating and aluminum melting, especially when operated with oxy-fuel fired burners. Regenerators provide a way to capture the heat contained in the gaseous combustion products (flue gas), and to use the captured heat to preheat oxidant or fuel that is fed to the furnace. A more efficient system is to employ regenerators to preheat both the fuel and the gaseous oxidant (which could be air, or a stream whose oxygen content is up to 100 vol. % oxygen), so that the heat recovery efficiency is improved and the flue gas exiting the regenerator is cooled below 1000 F.

Regenerator chambers are often separated by a single shared wall. For example the conventional air heating regenerator for an end-port glass melting furnace has two chambers, an air preheating chamber and a flue gas heat recovery chamber, which are directly adjacent to each other and separated by a single shared wall made of refractory material. As the regenerators age, often cracks are developed in refractory walls, including the shared wall, and the gas in the chamber with a higher pressure can leak into the adjacent chamber through the shared wall. For the case of air heating regenerators gas leakage through the shared wall causes a small loss of the combustion air into the flue gas stream. While the leak of combustion air reduces the efficiency of the heat recovery process, it does not cause safety or emissions issues. For TCR and O2 heating regenerators gas leaks through shared walls not only cause loss of fuel or oxygen into the flue gas stream with potential emissions issues, but also could cause mixing and combustion of fuel and oxygen in the regenerators. The potential problems of gas leaks through refractory walls also apply to the external walls for TCR and O2 heating regenerators. Gas leaks through external walls cause loss of fuel or oxygen to the ambient in the upper section of the regenerator chamber where the gas pressure inside the regenerator chamber is higher than the ambient pressure or ambient air leaks into the regenerator chambers in the lower section of the regenerator where the regenerator gas pressure is lower than the ambient pressure. Although external wall gas leaks can be controlled by installing external gas tight metal shells, there is potential for gas leaks from imperfect joints and seals.

The present invention provides improved heat recovery efficiency in furnace operations that employ regeneration or thermochemical regeneration with the fuel and the gaseous oxidant.

BRIEF SUMMARY OF THE INVENTION

One aspect of the present invention is a furnace comprising first and second regenerators each of which comprises
(A) a first opening that opens into the furnace,
(B) a second opening that does not open into the furnace,
(C) a passageway that extends through the regenerator between the first and second openings and through which a gaseous stream can flow in either direction into one of said openings and out of the other of said openings,
(D) solid mass which is capable of absorbing heat from a hot gaseous stream passing from the furnace through the passageway and which is capable of transferring heat absorbed by said mass to a gaseous stream passing through the passageway into the furnace, the furnace further comprising
(E) a partition between and connected to the first and second regenerators, comprising a first surface that is exposed to the passageway in the first regenerator, a second surface that is exposed to the passageway in the second regenerator, and top and bottom surfaces, the partition defining an interior void space which is in flow communication with the first and second surfaces, the partition also comprising an inlet through which gas can be fed into an interior void portion from outside the regenerators.

In preferred embodiments of the foregoing, the second opening of said first regenerator and the second opening of said second regenerator are connected to a source of gaseous fuel through a connection which can alternatingly provide said fuel to one or the other of said second opening; or, the second opening of said first regenerator and the second opening of said second regenerator are connected to a source of gaseous oxidant through a connection which can alternatingly provide said oxidant to one or the other of said second openings.

Another aspect of the present invention is a method of carrying out combustion in a furnace, comprising
(A) combusting fuel in a furnace to produce gaseous combustion products, and
(B) alternately
(1) passing gaseous combustion products from the furnace into and through a passageway in a cooled first regenerator to heat the first regenerator and cool said gaseous combustion products, and passing a first part of said cooled gaseous combustion products from said first regenerator, and fuel, into a heated second regenerator and, in the second regenerator, reacting the gaseous combustion products and the fuel in an endothermic reaction to form syngas comprising hydrogen and CO, and passing said syngas from the second regenerator into the furnace and combusting it in the furnace, while passing the remainder of said gaseous combustion products from said first regenerator to exhaust, and
(2) passing gaseous combustion products from the furnace into and through a passageway in a cooled second regenerator to heat the second regenerator and cool said gaseous combustion products, and passing a first part of said cooled gaseous combustion products from said second regenerator, and fuel, into a heated first regenerator and, in the first regenerator, reacting the gaseous combustion products and the fuel in an endothermic reaction to form syngas comprising hydrogen and CO, and passing said syngas from the first regenerator into the furnace and combusting it in the furnace, while passing the remainder of said gaseous combustion products from said second regenerator to exhaust;

wherein said first and second regenerators are connected by a partition between and connected to the first and second regenerators, wherein the partition comprises a first surface that is exposed to the passageway in the first regenerator, a second surface that is exposed to the passageway in the second regenerator, and top and bottom surfaces, the partition defining an interior void portion which is in flow communication with the first and second surfaces, the partition also comprising an inlet through which gas can be fed into an interior void portion from outside the regenerators; and feeding gas selected from the group consisting of air, gaseous combustion products formed by combustion in said furnace, nitrogen, carbon dioxide, steam, and mixtures thereof, into said interior void space to maintain the gas pressure in voids in said interior void space in excess of the gas pressure in said passageways that are exposed to surfaces of said partition.

Another aspect of the present invention is a method of carrying out combustion in a furnace, comprising (A) combusting fuel in a furnace to produce gaseous combustion products, and (B) alternately (1) passing gaseous combustion products from the furnace into and through a passageway in a cooled first regenerator to heat the first regenerator and cool said gaseous combustion products, and passing gaseous oxidant into a heated second regenerator to form heated oxidant and cool the second regenerator, and passing said heated oxidant from the second regenerator into the furnace and combusting it in the furnace, and (2) passing gaseous combustion products from the furnace into and through a passageway in a cooled second regenerator to heat the second regenerator and cool said gaseous combustion products, and passing gaseous oxidant into a heated first regenerator to form heated oxidant and cool the first regenerator, and passing said heated oxidant from the first regenerator into the furnace and combusting it in the furnace;

wherein said first and second regenerators are connected by a partition between and connected to the first and second regenerators, wherein the partition comprises a first surface that is exposed to the passageway in the first regenerator, a second surface that is exposed to the passageway in the second regenerator, and top and bottom surfaces, the partition defining an interior void space which is in flow communication with the first and second surfaces, the partition also comprising an inlet through which gas can be fed into an interior void portion from outside the regenerators; and feeding gas selected from the group consisting of air, gaseous combustion products formed by combustion in said furnace, nitrogen, carbon dioxide, steam, and mixtures thereof, into said interior void space to maintain the gas pressure in voids in said interior void space in excess of the gas pressure in said passageways that are exposed to surfaces of said partition.

In additional embodiments of the present invention, partitions are provided separately around each regenerator. Thus, one such embodiment is a furnace comprising at least two regenerators each of which comprises (A) a first opening that opens into the furnace, (B) a second opening that does not open into the furnace, (C) a passageway that extends through the regenerator between the first and second openings and through which a gaseous stream can flow in either direction into one of said openings and out of the other of said openings, (D) solid mass which is capable of absorbing heat from a hot gaseous stream passing from the furnace through the passageway and which is capable of transferring heat absorbed by said mass to a gaseous stream passing through the passageway into the furnace, (E) a refractory wall surrounding at least a portion of the exterior of the regenerator, and a top surface and a bottom surface which together with the refractory wall and the exterior of the regenerator define an interior void portion, and an inlet through which gas can be fed into said interior void portion from outside the regenerator.

One alternate method embodying this embodiment of the present invention is a method of carrying out combustion in a furnace, comprising (A) combusting fuel in a furnace to produce gaseous combustion products, and (B) alternately (1) passing gaseous combustion products from the furnace into and through a passageway in a cooled first regenerator to heat the first regenerator and cool said gaseous combustion products, and passing a first part of said cooled gaseous combustion products from said first regenerator, and fuel, into a heated second regenerator and, in the second regenerator, reacting the gaseous combustion products and the fuel in an endothermic reaction to form syngas comprising hydrogen and CO, and passing said syngas from the second regenerator into the furnace and combusting it in the furnace, while passing the remainder of said gaseous combustion products from said first regenerator to exhaust, and (2) passing gaseous combustion products from the furnace into and through a passageway in a cooled second regenerator to heat the second regenerator and cool said gaseous combustion products, and passing a first part of said cooled gaseous combustion products from said second regenerator, and fuel, into a heated first regenerator and, in the first regenerator, reacting the gaseous combustion products and the fuel in an endothermic reaction to form syngas comprising hydrogen and CO, and passing said syngas from the first regenerator into the furnace and combusting it in the furnace, while passing the remainder of said gaseous combustion products from said second regenerator to exhaust;

wherein each regenerator further comprises (i) a refractory wall surrounding at least a portion of the exterior of the regenerator, (ii) a top surface and a bottom surface which together with the refractory wall and the exterior of the regenerator define an interior void portion, and (iii) an inlet through which gas can be fed into said interior void portion from outside the regenerator; and feeding gas selected from the group consisting of air, gaseous combustion products formed by combustion in said furnace, nitrogen, carbon dioxide, steam, and mixtures thereof, into said interior void space to maintain the gas pressure in voids in said interior void space in excess of the gas pressure in said passageways.

Another alternate method embodying this embodiment of the present invention is a method of carrying out combustion in a furnace, comprising (A) combusting fuel in a furnace to produce gaseous combustion products, and (B) alternately (1) passing gaseous combustion products from the furnace into and through a passageway in a cooled first regenerator to heat the first regenerator and cool said gaseous combustion products, and passing gaseous oxidant into a heated second regenerator to form heated oxidant and cool the second regenerator, and passing said heated oxidant from the second regenerator into the furnace and combusting it in the furnace, and (2) passing gaseous combustion products from the furnace into and through a passageway in a cooled second regenerator to heat the second regenerator and cool said gaseous combustion products, and passing gaseous oxidant into a heated first regenerator to form heated oxidant and cool the first regenerator, and passing said heated oxidant from the first regenerator into the furnace and combusting it in the furnace;

wherein each regenerator further comprises (i) a refractory wall surrounding at least a portion of the exterior of the regenerator, (ii) a top surface and a bottom surface which together with the refractory wall and the exterior of the regenerator define an interior void portion, and (iii) an inlet through which gas can be fed into said interior void portion from outside the regenerator; and feeding gas selected from the group consisting of air, gaseous combustion products formed by combustion in said furnace, nitrogen, carbon dioxide, steam, and mixtures thereof, into said interior void space to maintain the gas pressure in voids in said interior void space in excess of the gas pressure in said passageways.

In preferred embodiments of any of the foregoing aspects of the present invention, the aforementioned inlet is connected to the interior of said furnace so that gaseous combustion products produced in said furnace can pass into said inlet.

Advantageously, in any of the foregoing aspects of the present invention, a temperature sensor is provided in the gas line that feeds gas to said interior void space by which the temperature within said void space can be read outside said regenerator, or a pressure sensor is provided in the gas line that feeds gas to said interior void space by which the pressure within said void space can be read outside said regenerator.

DETAILED DESCRIPTION OF THE INVENTION

Figure 1:
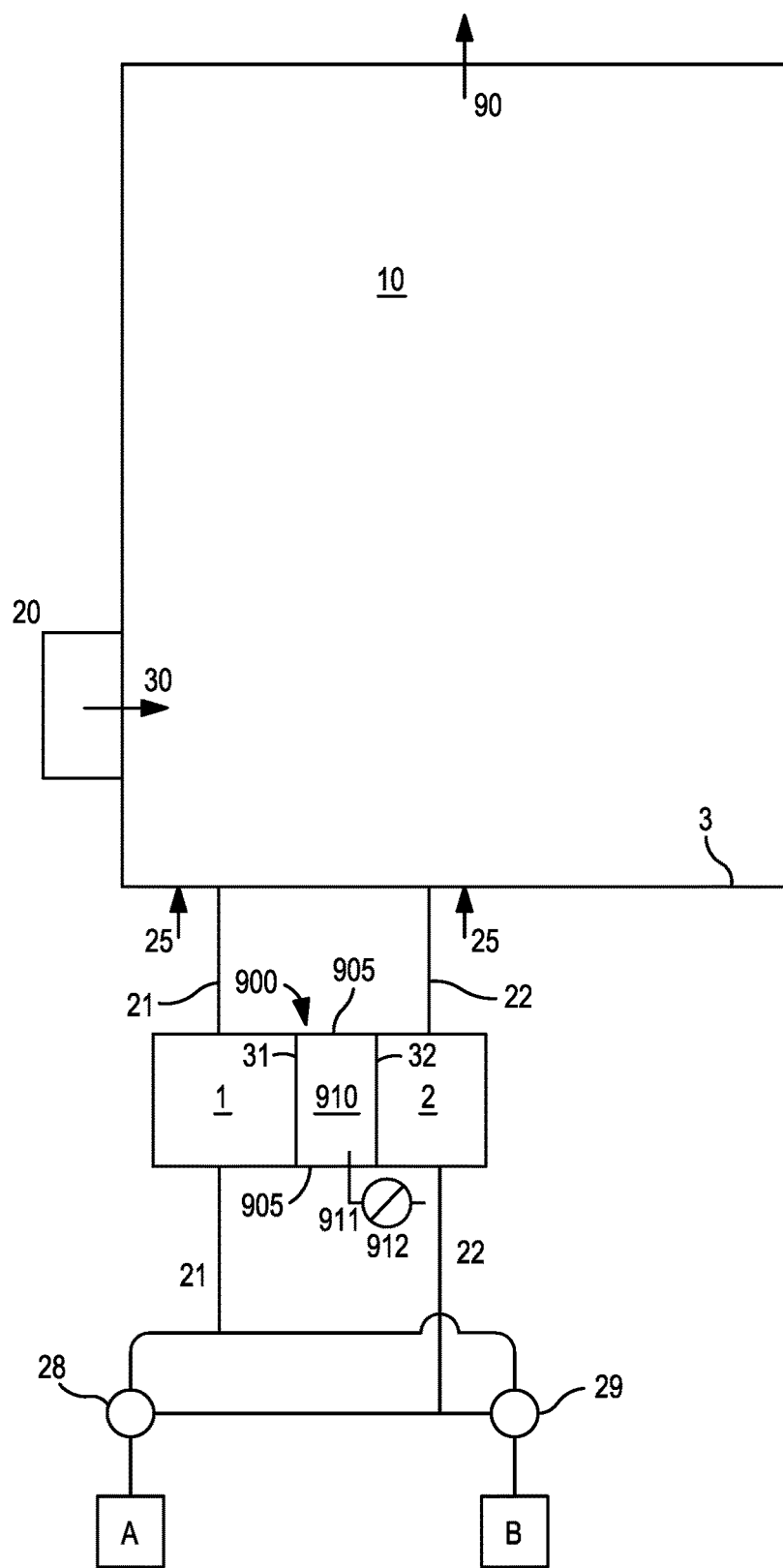
FIG. 1 is a schematic representation of one aspect of the present invention.

The present invention is useful in furnaces equipped with regenerators for heat recovery such as glassmelting furnaces, furnaces for heating and/or melting metals and ores; incinerators; cement kilns; and the like, wherein material is fed into the furnace and is heated and/or melted by the heat of combustion that occurs within the furnace. The combustion occurs between fuel, which can be any combustible gaseous hydrocarbon or atomized liquid hydrocarbon (preferably comprising C1-C4 compounds such as methane) as well as the syngas that may be produced as described herein, and gaseous oxidant which includes air and any gaseous mixture containing more oxygen than air. In particular the present invention monitors, reduces or eliminates gas leakage through an internal partition wall separating two regenerator chambers containing two different gases at two different pressures. The present invention also monitors, reduces or eliminates gas leakage through an external wall separating a regenerator chamber and the ambient atmosphere containing two different gases at two different pressures. Although the present invention is described using internal partition walls for the purpose of illustration, it is not limited to internal partition walls. Examples of internal partition walls in regenerators, include, but not limited to (1) the internal partition wall of air heating regenerators consisting of two chambers, one for receiving and storing heat from hot flue gas and the other for heating combustion air, (2) the internal partition wall of thermochemical regenerators consisting of two chambers, one for receiving and storing heat from hot flue gas and the other for heating/reforming fuel and reforming gas mixture, (3) the internal partition wall of oxygen heating regenerators consisting of two chambers, one for receiving and storing heat from hot flue gas and the other for heating oxygen, (4) the internal partition walls of dual thermochemical regenerators and oxygen heating regenerators consisting of four chambers, one for preheating oxygen, one for heating/reforming fuel and reforming gas mixture, the remaining two for receiving and storing heat from hot flue gas. In the following sections the present invention is described for regenerators with at least one partition wall for heating both gaseous oxidant and fuel.

In a typical furnace using regenerators for heating gaseous oxidant (by which is meant gas that contains oxygen, including air, oxygen-enriched air, or purified oxygen streams having an oxygen content of at least 50 vol. %, preferably at least 90 vol. %, and more preferably at least 95 or even 99 vol. %), there are two regenerators each containing a checker pack of conventional composition and construction for heat absorption from hot gaseous combustion products ("flue gas") that pass from the furnace into and through the regenerator, and for heating of cooler gases (such as gaseous oxidant) that pass through the regenerator and then into the furnace. At any given time one of the two regenerators is used to heat gaseous oxidant, and the other regenerator is being heated by passage of hot flue gases through it from the furnace. Then, as in conventional practice, the flows are reversed so that the stream of oxidant is passed into the furnace through the regenerator that hot flue gas had been passing through, and flue gas is passed from the furnace through the regenerator through which gaseous oxidant had been passing.

Referring to FIG. 1, furnace (10) has a feed station (20) where feed material (30) is fed into the furnace to be heated. When furnace (10) is a glassmelting furnace, the feed material (20) comprises solid glassmaking materials (known as batch and/or cullet). The flow of molten product out of furnace (10) is represented as (90).

The aforementioned regenerators are indicated as (1) and (2). Stream (21) passes through regenerator (1), alternatingly into and out of furnace (10). Stream (22) passes through regenerator (2), alternatingly into and out of furnace (10). The alternating flow of gas into one and then the other of a pair of regenerators is depicted in FIG. 1, in which gaseous oxidant from a source thereof shown as A passes through valve (28) and, depending on the position of valve (28), passes into either line (21) or line (22) and then into either regenerator (1) or (2) to be heated. When oxidant is heated by passing through regenerator (1), the heated oxidant passes from regenerator (1) into furnace (10) where it is combusted with fuel that is indicated as stream (25). At the same time, hot flue gas passes from the furnace (10) is passed through the other regenerator (2) that is not being used to heat the gaseous oxidant. The hot flue gas heats regenerator (2), and valve (29) directs the flow of the flue gas coming out of regenerator (2) to stack or other destination. When the flows are reversed, valves (28) and (29) are repositioned so that flue gas flows out of the furnace (10) through regenerator (1) and gaseous oxidant from source A flows into and through regenerator (2) and then into furnace (10).

Figure 2:
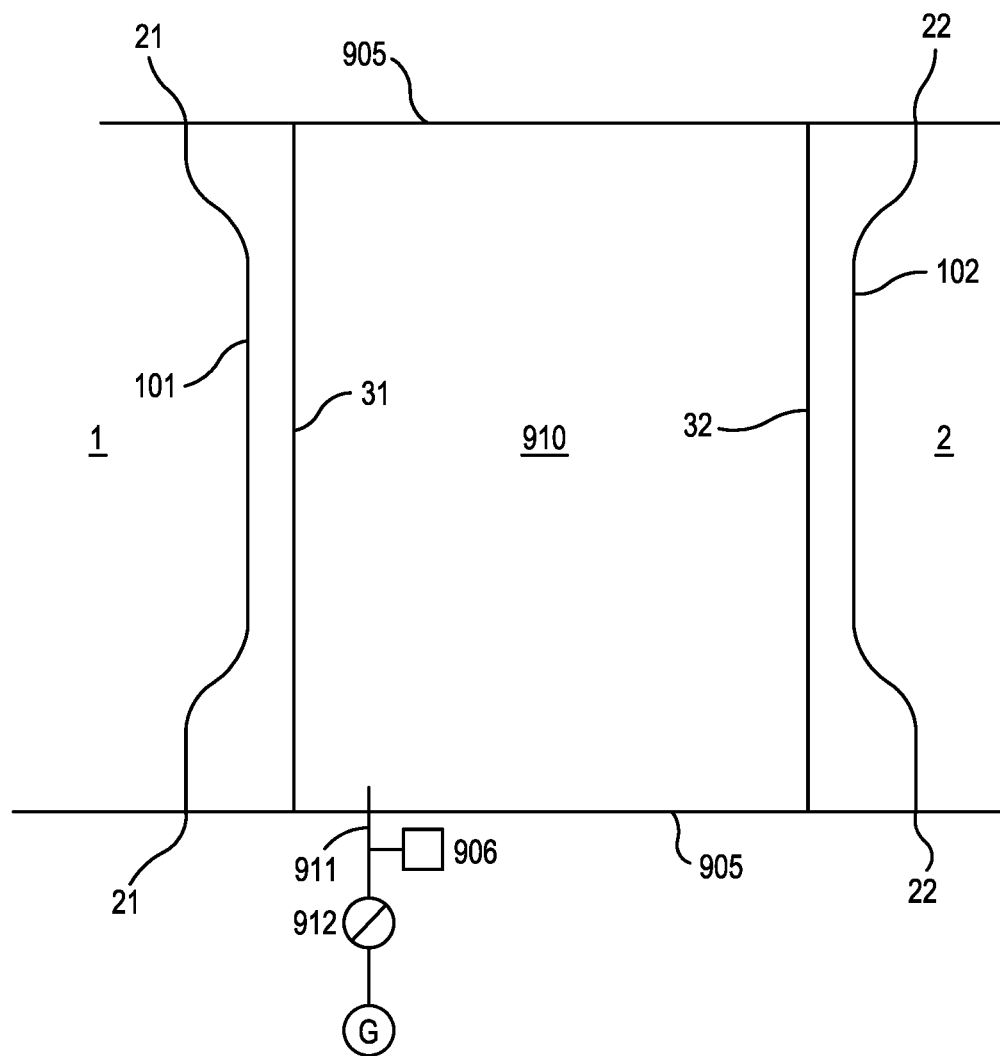
FIG. 2 is a closer view of one portion of the partition shown in FIG. 1.

Referring to FIGS. 1 and 2, regenerators (1) and (2) are connected by partition (900) which includes surface (31) that faces and is in contact with gas in a passageway (101) within regenerator (1) through which gas flows, and which also includes surface (32) that faces and is in contact with gas in passageway (102) within regenerator (2) through which gas flows. Partition (900) also include walls (905) that extend between adjacent regenerators (1) and (2). Partition (900) also includes a top surface and a bottom surface, and which together with surfaces (31), (32), and (905) define void space (910) which is capable of holding gas. The partition also includes inlet (911) through which gas can be fed into void space (910). Valve (912) controls the flow of gas into inlet (911). All or at least a portion of surfaces (31) and (32) are in contact with passageways (101) and (102), respectively.

Surfaces (31) and (32) are typically made of refractory material that can withstand the high temperatures encountered in operation of the regenerator. The refractory material often comprises bricks or slabs which are assembled together. As the regenerators are used, over time they can develop cracks in the refractory material or gaps between sections of refractory material, so that the regenerators can become gas-permeable, by which is meant that gas within a void space (910) in partition (900) can pass through gas-permeable portions of surfaces (31) and (32) into passageways (101) and (102). Void space (910) is in flow communication with inlet (911) and with the surfaces (31) and (32) of partition (900) through which gas can pass into passageways (101) and (102). This enables the gas that is fed into the interior of partition (900) to have the desired effect relative to the regenerators, as described herein. Other surfaces of partition (900) that are not in contact with the interiors of regenerators, such as surfaces shown as (905), may or may not become gas-permeable.

While the void (910) in partition (900) can be a single large empty cavity, as is suggested in FIG. 2, void (910) can alternatively contain solid structure or structures, such as a stack of bricks, so that void space (910) is formed of the connected void spaces and interstitial passages that are present between the respective solid objects. While more than one void space may be present within partition (900), the void (910) within partition (900) should preferably be one connected volume, to allow free flow of gas within the entire void.

The thickness of the partition (900) should be large enough to be structurally stable and strong to minimize formation of cracks by the typical thermal cycling of the regenerators. A typical effective design would be a total wall thickness of 700 millimeters (mm) (measured from surface (31) to surface (32)) and an interior void thickness of 50 mm.

Gas that is fed into the void or cavity space in the interior of partition (900) is pressurized (to a few inches water column above the gas pressure within the gas flow passageways (101) and (102) of the adjacent regenerators) and fed in through inlet (911) which has a conventional control valve (912) that is opened to permit a desired amount of gas to flow into the void (910) to maintain a proper gas pressure and that is closed when it is desired to retain the gas in the partition (900). A pressure sensor (906) located downstream of the control valve (912) monitors the gas pressure.

A preferred gas to use for feeding into the void (910) is flue gas, as it can easily be obtained from the furnace, such as after passing through a regenerator, and it is then passed through compressor (300) to increase its pressure. Flue gas has an advantage as the gas to pass into the partition (900) where the flue gas contains sodium sulfate and other small solid particles, so if the cavity wall develops cracks through which the cavity gas could leak, the solid particles in the flue gas can act as sealing particles to plug up the cracks. Other useful gases to feed into each partition (900) include air, inert gases such as nitrogen, carbon dioxide, or steam, and mixtures thereof. When the partition is situated between regenerators through which flue gas and oxygen (or air) are passed, air is preferred for use to feed into the partition. When the partition is situated between regenerators through which fuel gas (or mixtures of fuel and recycled flue gas as described below), and flue gas or gaseous oxidant are passed, the preferred gas to feed into the partition is inert gas such as nitrogen, carbon dioxide, steam, or flue gas, or mixtures thereof.

The pressure of the gas in the void space (910) in partition (900) is maintained to be slightly higher than the pressure in the adjacent regenerator passageways (101) and (102) at all elevations of the partition wall with voids so that a small amount of gas may permeate from the partition (900) into the passageways of the regenerators through the walls when the walls are porous and/or have developed cracks. Typical local pressures within the partition are at least +0.001" H2O (i.e., pressure in inches of water column), preferably +0.01"H2O, higher than the corresponding local pressure in the adjacent regenerator passageways (101) and (102) in the same elevation, as the typical pressures in the regenerator passageways vary between −0.5" H2O and +0.1" H2O relative to the atmospheric pressure depending on the elevation of the regenerator and the operating conditions.

The present invention is now described in particular detail with respect to a preferred type of furnace, namely one that employs a heat recovery process which recaptures usable heat from high temperature flue gas exhaust streams. This heat recovery process proceeds in two cycles, which are referred to herein as the flue cycle and the reforming cycle. These two cycles are performed alternatingly in two or more checker-filled regenerators. The heat recovery process is preferably carried out in association with furnaces and other combustion devices which employ "oxy-fuel" combustion processes, by which is meant combustion of fuel with gaseous oxidant comprising an oxygen content of at least 50 vol. % oxygen, and preferably at least 80 vol. % oxygen, more preferably at least 90 vol. % oxygen, and even at least 99 vol. % oxygen, because the flue gases produced by oxy-fuel combustion have higher H2O and CO2 concentrations, both of which promote the endothermic reforming reactions that are utilized in the method of this invention. During the flue cycle, the checkers in a first regenerator extract and store heat from a high temperature flue gas which is fed from the furnace into and through this regenerator. Then, in the reforming cycle, from the cooled flue gas that exits the first regenerator, a portion (which is referred to herein as Recycled Flue Gas or RFG) is fed into another regenerator and mixed with a stream of fuel (referred to herein as Reforming Fuel or RF). In the following description, pure methane (CH4) is described as reforming fuel for purposes of illustration. Other satisfactory reforming fuels include any combustible gas containing significant concentration of hydrocarbons, gas mixture, or vaporized liquid fuels including, but not limited to, natural gas, propane, and LPG (liquefied petroleum gas). Fuels that predominantly comprise H2 and CO such as producer gas generated by gasifying coal are not suitable as Reforming Fuel. Thus, the reforming fuel should comprise at least 25 vol. % of one or more gaseous hydrocarbons of the formula $CH_4$ and/or $C_XH_Y$ wherein X is 2-4 and Y is X to (2X+2).

In the reforming cycle, the RFG/Reforming Fuel mixture enters the second regenerator in which the checker has already been heated, as described herein, and flows through it towards the furnace. The temperature of the RFG/RF mixture passing through the second regenerator continues to increase by extracting heat from the already pre-heated checker. As the RGF/RF mixture passes through the second regenerator, it reaches a temperature at which thermal dissociation reactions and reforming reactions begin to occur and continue to occur, producing products including H2 and CO. These reactions are endothermic and the heat needed to promote these reactions is absorbed from the heated checker. Thermal dissociation reactions of fuel are known as cracking reactions and produce many fuel species such as H2, C2H2, C2H4, and soot. The reforming reactions produce a gaseous composition which typically comprises one or more components such as such as H2, CO, and unreacted gases comprising H2O, CO2 and CH4. The gaseous composition thus produced may also be called "syngas" herein. The mixture of gaseous products emerges from the second regenerator into the furnace wherein the combustible gaseous components are combusted with oxidant to provide thermal energy for heating and/or melting material in the furnace. This combustion may combust a portion of any soot present with the gaseous products as well.

Gaseous oxidant for combustion in the furnace can also have been heated before it is fed into the furnace, by passing it into and through a regenerator that has previously been heated. At the same time, a portion of the gaseous combustion products formed in the furnace are passed out of the furnace through another regenerator, to heat that regenerator which would then be used to heat gaseous oxidant.

After a length of time, the operation of the two regenerators is reversed, i.e., the regenerator that was used in the flue cycle is switched to the reforming cycle, and the regenerator that was used in the reforming cycle is switched to the flue cycle. Prior to the reversal the flow of reforming fuel is stopped and the RFG flow is continued until some or all of the residual reforming fuel and syngas in the regenerator are purged out of the regenerator and combusted in the furnace. This purging step also acts to remove soot deposited on checker surfaces in the regenerator as soot reacts with RFG and is gasified. Upon this reversal, the regenerator that was heated by outgoing flue gas is switched to start heating incoming oxidant, and the regenerator that was used to heat incoming oxidant is switched so that flue gas exiting the furnace passes through it in order to reheat it for use in heating oxidant. After a further period of time, the operation of the two pairs of regenerators is reversed again. The timing of the reversals can be determined by elapsed time, or by other criteria such as the temperature of the flue gas exiting from the first regenerator that is in flue cycle. The reversal process is carried out according to a predetermined mechanism and plan, wherein valves are sequenced to open and close based on specific timings.

The operation and control of this embodiment of the present invention is described below in conjunction with FIGS. 3, 4 and 5. An end-port fired glass furnace (10) fitted with two regenerators in end wall (3) is used as an example.

Figure 3:
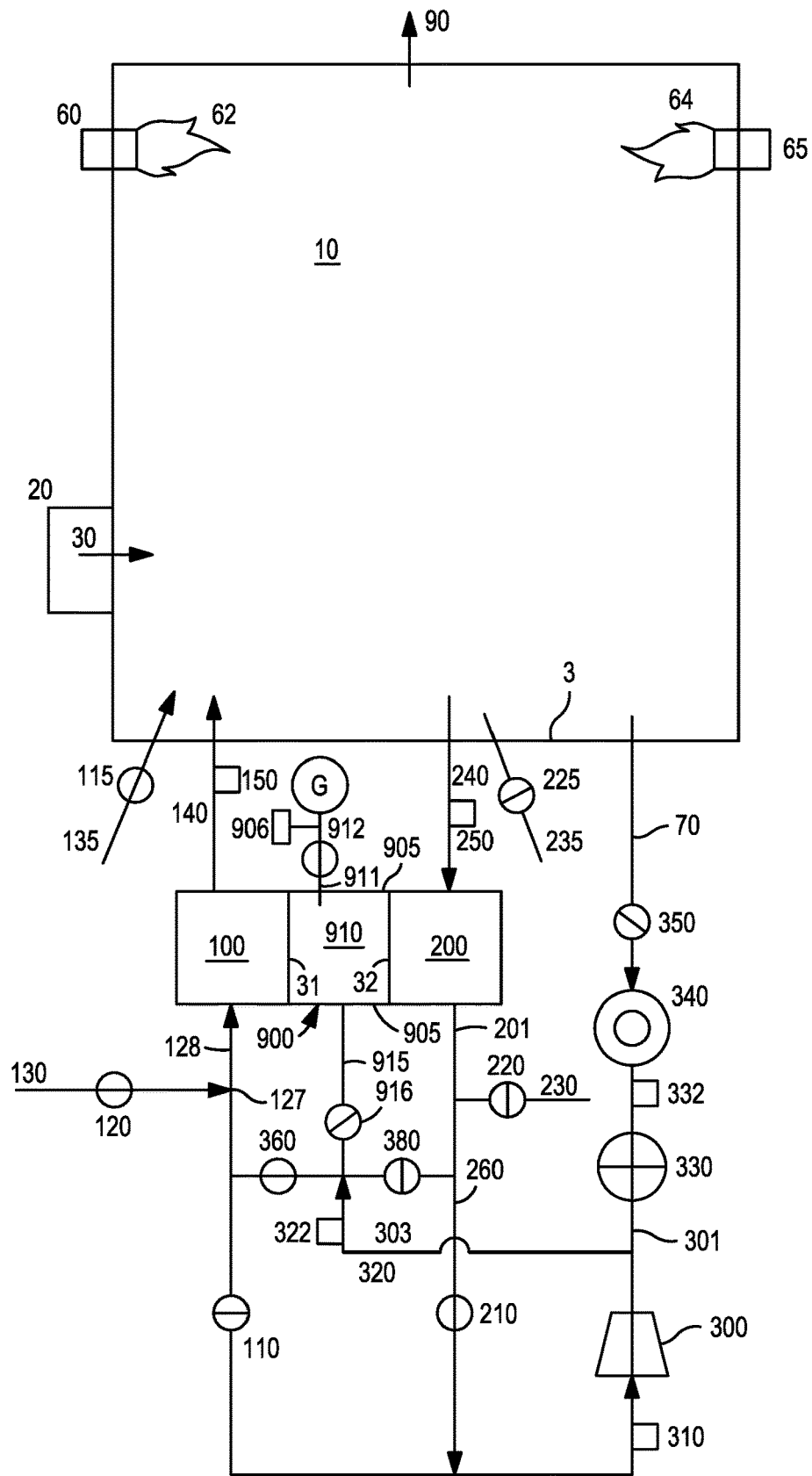
FIG. 3 is a schematic representation of a preferred embodiment of the present invention.

As shown in FIG. 3, end-port glass furnace (10) has a feed station (20) where feed material (30) comprising solid glassmaking materials (known as batch and/or cullet) are charged into the furnace to be heated and melted. The flow of molten glass out of furnace (10) is represented as (90). The furnace (10) is equipped with first regenerator (100) and second regenerator (200). Vertical cross-sectional views of the two regenerators are displayed in more detail in FIGS. 4 and 5. Partition (900) as described above is situated between regenerators (100) and (200). Partition (900) includes surfaces (31) and (32) through which gas may permeate from void space (910) in the interior of partition (900), into passageways in the interior of regenerators (100) and (200). Partition (900) also includes surfaces (905) which are not gas-permeable and are not in contact with interior passageways of the regenerators.

Gas to be fed through inlet (911) into the partition as described above, can be recycled flue gas (320) which enters line (915) through valve (916), or the gas can be other gas or gas mixtures as described above, from source G thereof.

When furnace (10) is a glassmelting furnace, glassmaking material (30) is fed into feed station (20) in which the glassmaking material can be heated and then fed into furnace (10). Glassmaking material (30) can include solid material which when melted forms molten glass which can then be formed into glass articles. The glassmaking material can include material known as cullet, which comprises pieces of glass such as recycled glass containers and bottles. Glassmaking material (30) may also contain raw materials which when melted form glass or enter into reactions to form glass. Such materials are known as "batch"; examples include silica sand, soda ash, limestone, dolomite, other carbonates, sulfates, oxides and hydroxides of sodium, calcium, magnesium and potassium.

Figure 4:
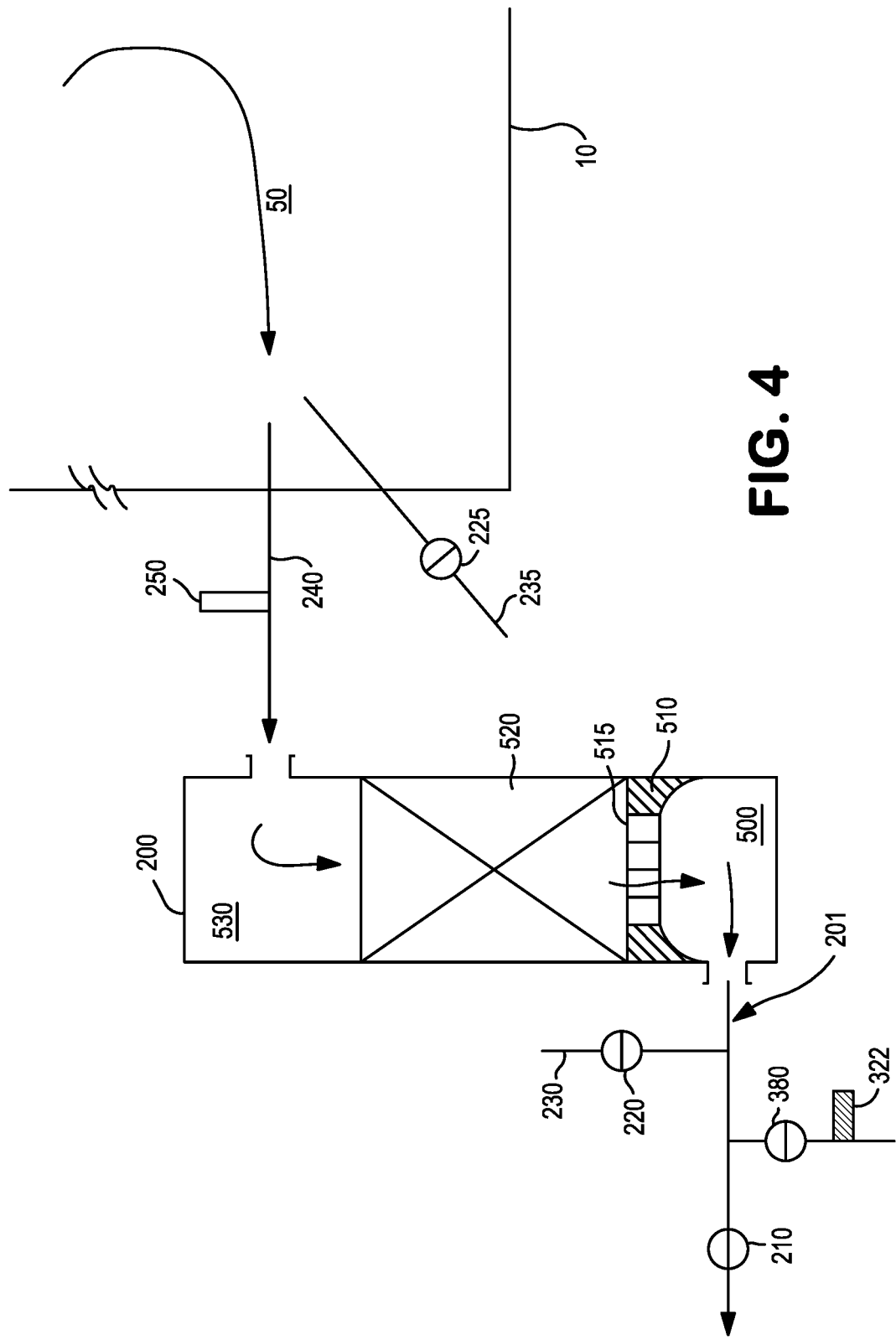
FIGS. 4 and 5 are cross-sectional views of components of the embodiment shown in FIG. 3.

As seen in FIG. 4, regenerator (200) is in the flue cycle wherein flue gas stream (50) from the interior of furnace (10) enters port neck (240) and then flows to the top space (530) of regenerator (200) past an oxygen analyzer (250). The flue gas stream heats checkers (represented as (520)) as it flows through passages between the checkers within regenerator (200), and enters chamber bottom space (500) through gas passages (515) supported on arch (510) which also supports the weight of the whole bed of checkers. As seen in FIG. 3, a portion (52) of the flue gases produced in furnace (10) may be by-passed to conduit (70) through a partially opened valve (350) then enters stack (340) to exhaust, by which is meant that it does not re-enter the furnace but instead is discharged to the atmosphere and/or conveyed to one or more other stations for storage and/or further treatment or any combination of such destinations. For maximum heat recovery, it is preferred that valve (350) is closed so that essentially all the furnace flue gas goes to regenerator (200) as flue gas stream (50).

As seen in FIGS. 3 and 4, the cooled flue gas stream (201) exits the regenerator (200) in conduit (260), passes through an open valve (210) and oxygen sensor (310), and then enters the suction-side of blower (300). The majority of the flue gas (301) leaving the pressure-side of the blower passes through a damper (330) then a flow meter (332), and finally is directed into stack (340) through which this flue gas leaves the system to exhaust as defined herein. A portion (303) of the flue gas is recycled to the bottom of regenerator (100) by passing through conduit (320) and valve (360). This is also referred to as Recycled Flue Gas (RFG). Its flow is metered by a flow meter (322). Reforming fuel which is to be fed to the second regenerator (100) is supplied by a conduit (130) through valve (120).

Suitable reforming fuels include methane (which is preferred) as well as any other combustible gas, gas mixture, or vaporized liquid fuels including, but not limited to, natural gas, propane, and LPG (liquefied petroleum gas).

Figure 5:
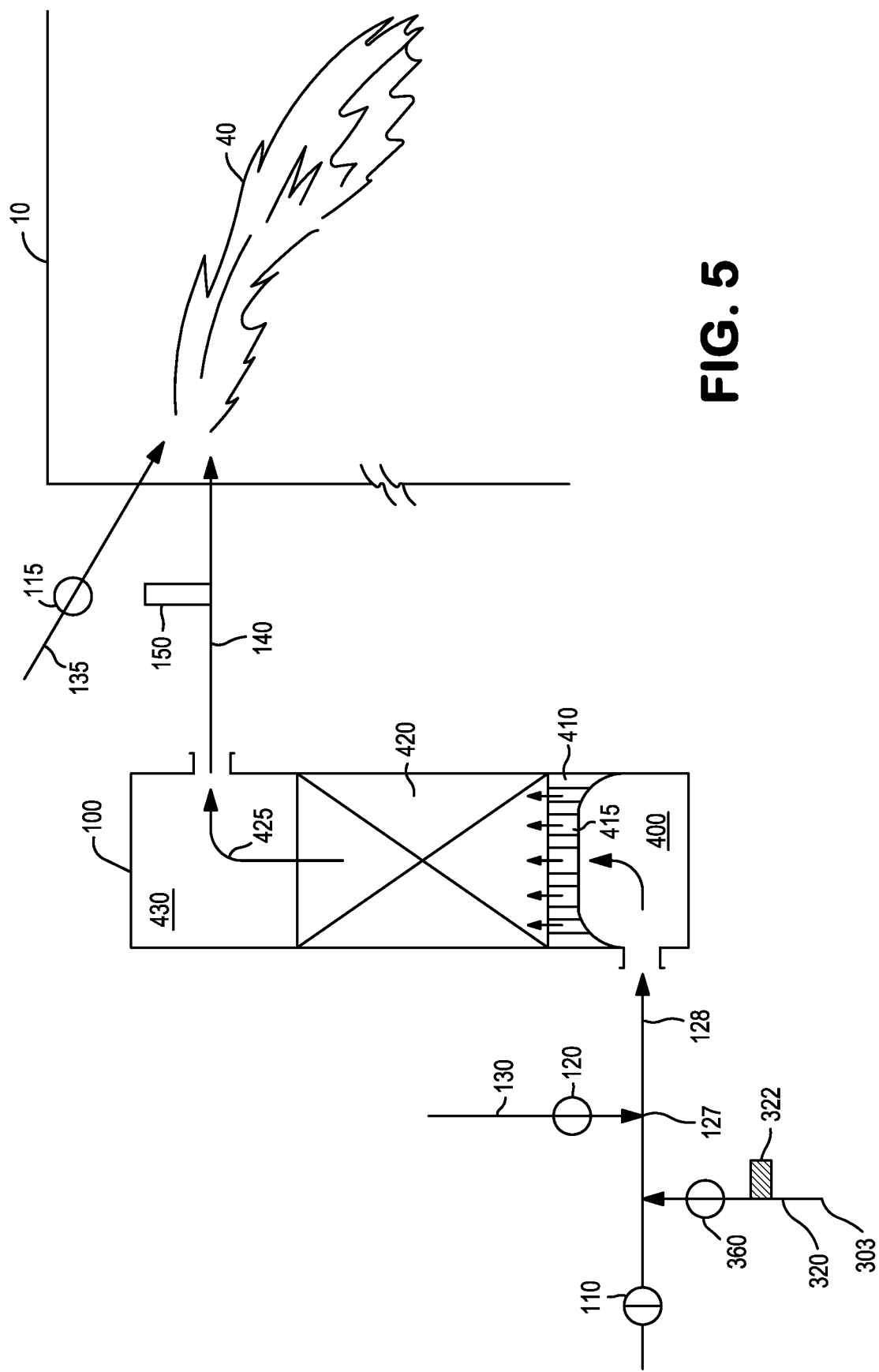

As seen in FIG. 5, the reforming fuel (RF) from stream (130) intersects and mixes with the RFG (303) at location (127) in conduit (128) which also communicates with the bottom space (400) of regenerator (100). This RFG/RF mixture enters the already pre-heated checker pack (420) of regenerator (100) through gas passages (415) on arch (410). Regenerator (100) has already been heated in a previous cycle by passage of flue gas from the furnace into and through the regenerator (100). The temperature of the RFG/RF mixture increases as it flows through the checker pack of regenerator (100). When the temperature of the RFG/RF reaches reforming temperature, endothermic reforming reactions occur in which the reforming fuel (e.g. CH4) reacts with CO2 and H2O in the RFG and forms CO, H2, and soot. The required heat for the endothermic reforming reactions is taken from the heated checkers. The reforming reaction continues as the RFG/RF mixture continues to travel toward the top space (430). The gaseous stream (425) (referred to herein as a "reformed" or "syngas" gas stream) exits from the top of checker pack (420). Stream (425) has high temperature and may include species such as CO, $H_2$, soot, unreacted $CH_4$, and unreacted $CO_2$ and $H_2O$. The stream (425) passes through port neck (140) and oxygen sensor (150), and enters furnace (10). This stream exits checker pack (420) at temperatures for example ranging from 1800 F to 2500 F.

Oxidant for combustion of the syngas is supplied by a conduit (135) with an opened valve (115). This oxidant can be air, or it can have an oxygen content higher than that of air, i.e. at least 21 vol. %, and preferably equal to or higher than 80 vol. %, more preferably equal to or higher than 90 vol. %, or even at least 99 vol. %.

Typically, the heat recovery process proceeds with one regenerator in the flue cycle and one regenerator in the reforming cycle, as seen in FIG. 3, for about 20 to 40 minutes or until the checkers in the reforming regenerator are too cold to provide sufficient heat to promote the desired endothermic chemical reactions. At that point, and now continuing with the description herein where regenerator (200) was in the flue cycle and regenerator (100) was in the reforming cycle, furnace (10) undergoes reversal in which regenerator (200) is transitioned to the reforming cycle for heat recovery and regenerator (100) is transitioned into the flue cycle for heat accumulation. Before the reversal, remaining syngas in regenerator (100) is to be purged to furnace (10). As described more fully below, reforming fuel supplied to the regenerator is terminated at first by closing valve (120) while letting the flow of RFG from blower (300) continue. Remaining syngas in regenerator (100) is purged by the RFG for a specified amount of time so that nearly all the syngas in the regenerator is expelled to the furnace and combusted to completion.

Upon reversal, the flue gas from the furnace passes through regenerator (100), and a portion thereof passes to exhaust (as defined herein) while a portion or the balance is mixed with fuel and the mixture is passed through regenerator (200) and into the furnace. Valve (110) which had been closed is opened, valve (210) is closed, and valve (360) is closed and valve (380) is opened, to permit heated flue gas to pass from regenerator (100) toward and through blower (300), and to permit a portion (303) of this flue gas to pass into regenerator (200) after it is mixed with reforming fuel (230) which enters through valve (220) which had been closed but now is opened. Valve (115) which had been open is closed, as no combustion aided by oxidant through valve (115) occurs in this phase, and valve (225) is opened. The resulting mixture of reforming fuel and recycled flue gas undergoes in regenerator (200) the endothermic reforming reactions which had occurred in regenerator (100) in the previous cycle as described herein, to produce stream (425) of syngas which passes into furnace (10) where it is combusted with oxidant (235) that is fed through valve (225).

During the heat recovery process, furnace (10) may be co-fired with other burners such as (60) and (65) such that both syngas flame (40) and burner flames (62) and (64) co-exist. In addition, burners (60) and (65) may or may not be firing during the reversal process when the reforming regenerator (i.e. (100) or (200) as the case may be) is undergoing the purging sequence described above. For maximum heat recovery, it is preferred that burners (60) and (65) are not co-firing with the syngas flame (40). It is also preferred that during the purging sequence, burners (60) and (65) are not firing.

Typical temperatures are provided here for operation of the invention with a glassmaking furnace.

Flue gas stream (240) entering regenerator (200) is typically at 2500 F to 3000 F, and stream (201) exiting regenerator (200) is typically at 500 F to 1000 F. Stream (235) entering regenerator (700) is also typically at 2500 F to 3000 F, and stream (701) exiting regenerator (700) is typically at 500 F to 1000 F. Stream (128) of mixed recycled flue gas and reforming fuel entering regenerator (100) is typically at 300 F to 1000 F, and stream (140) of reformed product is typically at 1800 F to 2400 F. Stream (606) of oxidant entering regenerator (600) is typically at zero degrees F. or ambient temperature, up to 100 F. Stream (135) of heated oxidant exiting regenerator (600) is typically at 1800 F to 2400 F.

The temperatures within each regenerator will be expected to rise and fall through each cycle, and the temperatures will be different at different locations within the regenerators. In the operation of the invention with a typical glassmelting furnace, the temperatures within regenerator (200) at the start of the cycle may be on the order of 500 F to 900 F at the bottom of the regenerator and 1800 F to 2300 F at the top, and may be expected to rise by the end of this cycle to temperatures on the order of 600 F to 1000 F at the bottom and 1900 F to 2400 F at the top. In the same cycle, the temperatures within regenerator (700) at the start of the cycle may be on the order of 500 F to 900 F at the bottom of the regenerator and 1800 F to 2300 F at the top, and may be expected to rise by the end of this cycle to temperatures on the order of 600 F to 1000 F at the bottom and 1900 F to 2300 F at the top. In the same cycle, the temperatures within regenerator (100) at the start of the cycle may be on the order of 600 F to 1000 F at the bottom of the regenerator and 1900 F to 2400 F at the top, and may be expected to be cooled by the end of this cycle to temperatures on the order of 500 F to 900 F at the bottom and 1800 F to 2300 F at the top. In the same cycle, the temperatures within regenerator (600) at the start of the cycle may be on the order of 600 F to 1000 F at the bottom of the regenerator and 1900 F to 2400 F at the top, and may be expected to be cooled by the end of this cycle to temperatures on the order of 500 F to 900 F at the bottom and 1800 F to 2300 F at the top.

These figures would be expected if the cycle is reversed approximately every 20 minutes. When the cycle is reversed less often, the difference between the temperatures at the beginning and end of each cycle (100 F in this example) would be expected to be larger, and even twice, i.e., about 200 F, as large as these figures if the cycles are reversed half as often, that is, every 40 minutes.

It is preferred to monitor the integrity of the partition walls in contact with the regenerators, thereby determining whether there is excessive leakage of gas out of a regenerator passageway, by monitoring the pressure in the cavity, or by monitoring the flow rate or temperature of the flue gas or, in the embodiment described below employing thermochemical regeneration, by monitoring the temperature of the flue gas pipe between the inlet at the fan and the inlet (911) connected to the gas cavity. When the leak flow rate out of the regenerator is low the temperature of the pipe is close to the ambient temperature. When the leak flow rate is high, the temperature of the pipe approaches that of the flue gas flow which is in a range between 700 F to 1300 F for TCR operation with or without oxygen heating regenerators. Thus, by monitoring the pipe temperature the presence of a large gas leakage from the regenerators can be monitored. Temperature measurement is easier to maintain and less expensive than gas pressure monitoring. In the FIG. 2, (906) represents a temperature sensor such as a thermocouple, or a pressure sensor, used for this purpose.

Since there is no flow rate of gas from the gas cavity into the adjoining regenerator if the intervening wall is gas tight, the pressure of the gas in the cavity is the same as the outlet pressure at the fan plus the buoyancy effect as the cavity gas temperature will be heated to the same temperature as the local wall temperature.

A small leak of gas from a cavity into a stream of flue gas in an adjacent regenerator passageway would simply cause a small increase in the amount of flue gas, such as the flue gas which is normally mixed into the fuel for thermochemical regeneration operation. A small leak of gas from a cavity into a stream of gaseous oxidant in an adjacent regenerator passageway would dilute the oxygen concentration of the oxidant stream, which is not a problem for combustion in the furnace. A small leak of gas from a cavity into a flue gas stream causes a small increase in the flue gas volume flow rate. If a large gas leaks develop, the pressure is reduced, and hence signifies a potential gas leakage. In the thermochemical regenerator operation described herein, both the fuel and the oxygen regenerator passageways are purged by recycled flue gas at the end of each heating cycle, so a small continuous leakage of flue gas from the cavity into both passageways can be allowed. Preferably the maximum total flow rate of gas flow leaking from the cavity through the walls into the adjacent regenerator gas flow passageways is less than 50%, more preferably less than 20%, and most preferably less than 10%, of the flow rate of the natural gas introduce into the thermochemical regeneration chamber.

This invention provides several advantages. It reduces and usually eliminates the risk of gas leaks out through the internal walls of the gas flow passageways of regenerators, which could result in loss of some of oxygen and fuel into flue gas or mixing of fuel and oxygen which could cause combustion inside the regenerator chambers. Another risk that is reduced and usually eliminated is the risk of gas leakage through such an internal wall separating a fuel passageway and an oxidant passageway, which could form a high temperature local flame and potentially melt or damage the regenerators.

As mentioned above, this invention also provides similar advantages for external walls, especially when applied to the top section of the external walls where the gas pressure inside the external wall is higher than the ambient pressure. It reduces and usually eliminates the risk of gas leaks out through the external walls of the gas flow passageways of regenerators, which could result in loss of some of oxygen and fuel into ambient atmosphere which could potential hazards. Another risk that is reduced and usually eliminated is the risk of oxygen leakage through such an external wall separating an oxidant passageway, which could cause reaction with external steel shell and potentially melt or damage the regenerators.

Accordingly, embodiments of this invention include the following, which are now described with reference to FIGS. 6 and 7. Reference numerals that appear in FIGS. 6 and 7 that also appear in any of FIGS. 1-5 have the meanings and function as described above with respect to FIGS. 1-5.

Figure 6:
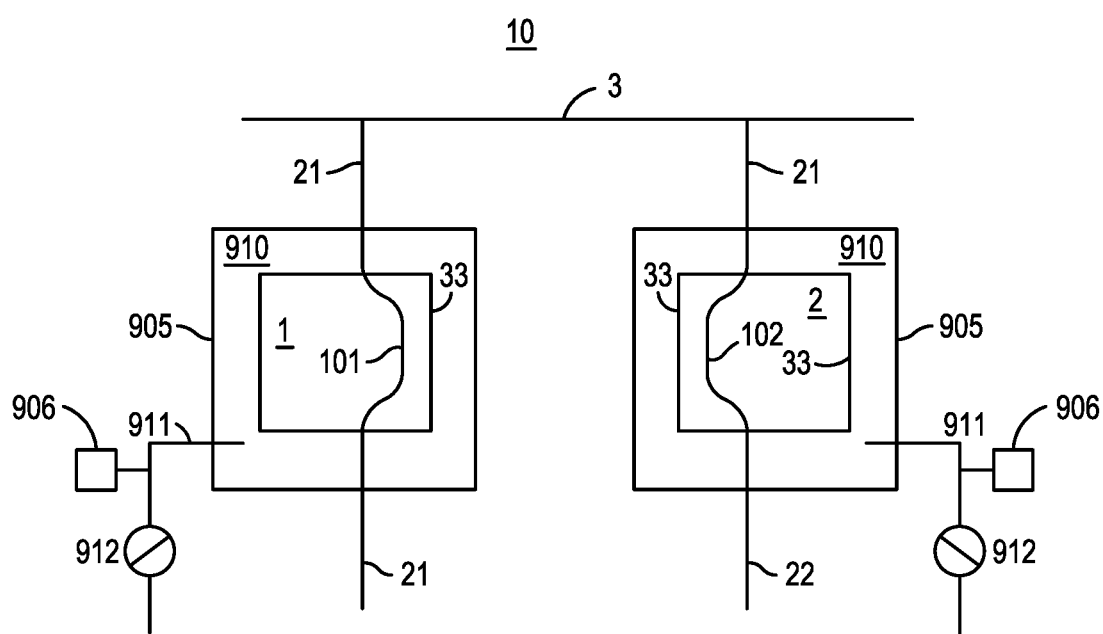
FIG. 6 is a view of another embodiment of the present invention.

In FIG. 6, the exterior surface (33) of each regenerator (1) and (2) is separately surrounded at least in part by surfaces (905) which together with a top surface and a bottom surface define void space (910). FIG. 6 shows the preferred embodiment in which each regenerator is completely surrounded by surfaces (905). The surfaces (905) should be formed of refractory material such as high-temperature brick, or steel shells. Streams (21) and (22) pass through regenerators (1) and (2) in directions that periodically alternate, so that each stream alternatingly flows out of furnace (10) and heats material in a regenerator, and then flows through the regenerator into furnace (10) and in doing so absorbs heat from heated material in the regenerator. Inlet (911), valve (912) and gauge (906) have the meanings and functions described herein above with respect to FIGS. 1-2.

Figure 7:
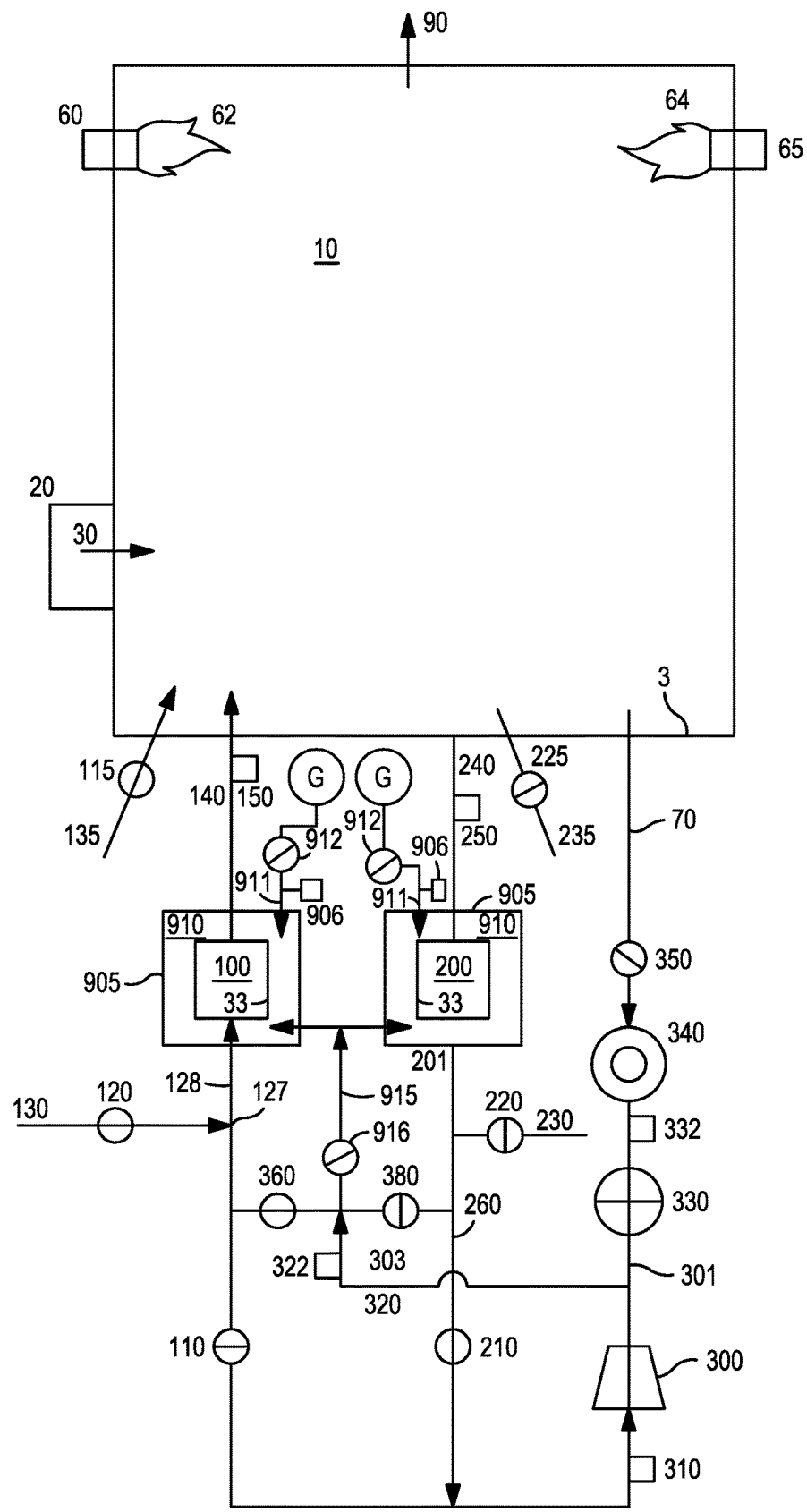
FIG. 7 is a schematic representation of another embodiment of the present invention.

Referring to FIG. 7, it can be seen that each regenerator (100) and (200) is separately surrounded by surfaces (905), and provision is shown for providing gas (911) and/or (915) separately into the void spaces (910) that are provided around regenerator (100) and around regenerator (200).

The embodiments shown in FIGS. 6 and 7 are operated in the manner described above with respect to the embodiments of FIGS. 1-5. That is, gas which may be flue gas (915), and/or other gas (911) from another source G, as described above with respect to FIGS. 1-5, is fed into the void spaces (910) to maintain positive pressure against the possible leakage of gas out of the regenerators (100) and/or (200).

What is claimed is:

1. A furnace comprising at least a first regenerator and a second regenerator each of which comprises
   (A) a first opening that opens into the furnace,
   (B) a second opening that does not open into the furnace,
   (C) a passageway that extends through the regenerator between the first and second openings and through which a gaseous stream can flow in either direction into one of said openings and out of the other of said openings,
   (D) solid mass which is capable of absorbing heat from a hot gaseous stream passing from the furnace through the passageway and which is capable of transferring heat absorbed by said mass to a gaseous stream passing through the passageway into the furnace,
the furnace further comprising
   (E) a partition between and connected to the first and second regenerators, comprising a first surface that is exposed to the passageway in the first regenerator, a second surface that is exposed to the passageway in the second regenerator, and top and bottom surfaces, the partition defining an interior void space which extends from the top surface to the bottom surface and which is in flow communication with the first and second surfaces, the partition also comprising an inlet through which gas can be fed into an interior void portion from outside the regenerators.

2. A furnace according to claim 1 wherein the second opening of said first regenerator and the second opening of said second regenerator are connected to a source of gaseous fuel through a connection which can alternatingly provide said fuel to one or the other of said second openings.

3. A furnace according to claim 1 wherein the second opening of said first regenerator and the second opening of said second regenerator are connected to a source of gaseous oxidant through a connection which can alternatingly provide said oxidant to one or the other of said second openings.

4. A furnace according to claim 1, wherein said inlet is connected to the outlet of a blower that compresses gaseous combustion products produced and cooled in said regenerators.

5. A furnace according to claim 1 further comprising a temperature sensor in the gas feed line connected to said inlet by which the temperature within said void space can be read outside said regenerator.

6. A furnace according to claim 1 further comprising a pressure sensor in the gas feed line connected to said inlet by which the pressure within said void space can be read outside said regenerator.

* * * * *